United States Patent [19]
Cheng

[11] Patent Number: 6,122,168
[45] Date of Patent: Sep. 19, 2000

[54] POWER SUPPLY

[76] Inventor: Henry Cheng, 801 Gazebo C.T., Suisun, Calif. 94585

[21] Appl. No.: 09/320,542

[22] Filed: May 27, 1999

[51] Int. Cl.⁷ ...................................................... H05K 7/20
[52] U.S. Cl. .......................... 361/695; 361/690; 361/694; 361/704; 361/720; 174/16.1; 165/80.3; 165/104.34; 165/185
[58] Field of Search ..................................... 361/688, 687, 361/694–697, 715; 165/80.3, 121–126, 185; 454/184

[56] References Cited

U.S. PATENT DOCUMENTS

| | | | |
|---|---|---|---|
| 5,523,917 | 6/1996 | Searby | 361/687 |
| 5,862,037 | 1/1999 | Behl | 361/695 |
| 5,876,278 | 3/1999 | Cheng | 361/695 |
| 5,898,568 | 4/1999 | Cheng | 361/695 |
| 5,955,955 | 9/1999 | Corcoran, Jr. et al. | 361/695 |

*Primary Examiner*—Leo P. Picard
*Assistant Examiner*—Boris L. Chervinsky
*Attorney, Agent, or Firm*—Michael D. Bednarek; Crowell & Moring LLP

[57] ABSTRACT

A power supply includes a housing, a printed circuit board, at least one electrical element and a fan assembly. The housing has an interior and an exterior. The printed circuit board is provided in the interior of the housing, while the electrical element is attached onto the printed circuit board. The fan assembly is also provided in the interior of the housing. The fan assembly includes a shell and a fan. The shell includes two surface boards and plural side walls connected between the two surface boards. The interior and the exterior of the housing are communicated by a first hole formed on one of the two surface boards and at least one second hole formed on one of the plural side walls. The fan is mounted in the shell to ventilate the interior of the housing through the first hole and the second hole.

4 Claims, 4 Drawing Sheets

POWER SUPPLY

BACKGROUND OF THE INVENTION

1. Field of the Invention

The present invention relates in general to a power supply characterized by small size, less noise and long life span.

2. Description of the Related Art

As shown in FIGS. 1 and 2, a conventional power supply has a housing 12, a printed circuit board (PCB) 16 received in the housing 12 and a plurality of electrical elements 18 attached onto the PCB 16. In operation, the temperature of the electrical elements 18 is high. Thus, a fan assembly 14 is provided to ventilate the inside of the power supply. Hot air in the housing 12 is drained out via holes 120 on the housing 12 so as to cool down the electrical elements 18.

The conventional power supply has many flaws: (1) The power supply is very thick because the fan assembly 14 is vertically arranged to ventilate the inside of the power supply. (2) The weight of the fan of the fan assembly acts laterally on the spinning shaft (not shown) of the fan due to the vertical arrangement of the fan assembly. In design, a lateral load on a spinning shaft should be avoided in order to prolong the life span of the shaft. (3) The conventional power supply is very noisy because the fan is disposed very close to the holes 120, which constitute the airflow outlet. This arrangement generates so called "Aerodynamic Noise".

SUMMARY OF THE INVENTION

An object of the present invention is to provide a power supply that solves the above-mentioned problems.

The power supply of the present invention includes a housing, a printed circuit board, at least one electrical element and a fan assembly. The housing has an interior and an exterior. The printed circuit board is provided in the interior of the housing, and the electrical element is attached onto the printed circuit board. The fan assembly is also provided in the interior of the housing. The fan assembly includes a shell and a fan. The shell includes two surface boards and plural side walls connected between the two surface boards. The interior and the exterior of the housing are communicated by a first hole formed on one of the two surface boards and at least one second hole formed on one of the plural side walls. The fan is mounted in the shell to ventilate the interior of the housing through the first hole and the second hole. By this arrangement, the fan is disposed a proper distance from the second hole, which is the airflow outlet. Thus, the noise of the power supply is greatly reduced.

Furthermore, the fan assembly is horizontally arranged to ventilate the interior of the power supply. That is, the two surface boards of the fan assembly are arranged in parallel to the printed circuit board in order to ventilate the interior of the power supply. Thus, the thickness of the power supply is greatly reduced even if the fan assembly is large. Furthermore, the weight of the fan does not laterally act on the shaft of the fan due to the horizontal arrangement. The life span of the fan assembly is prolonged.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
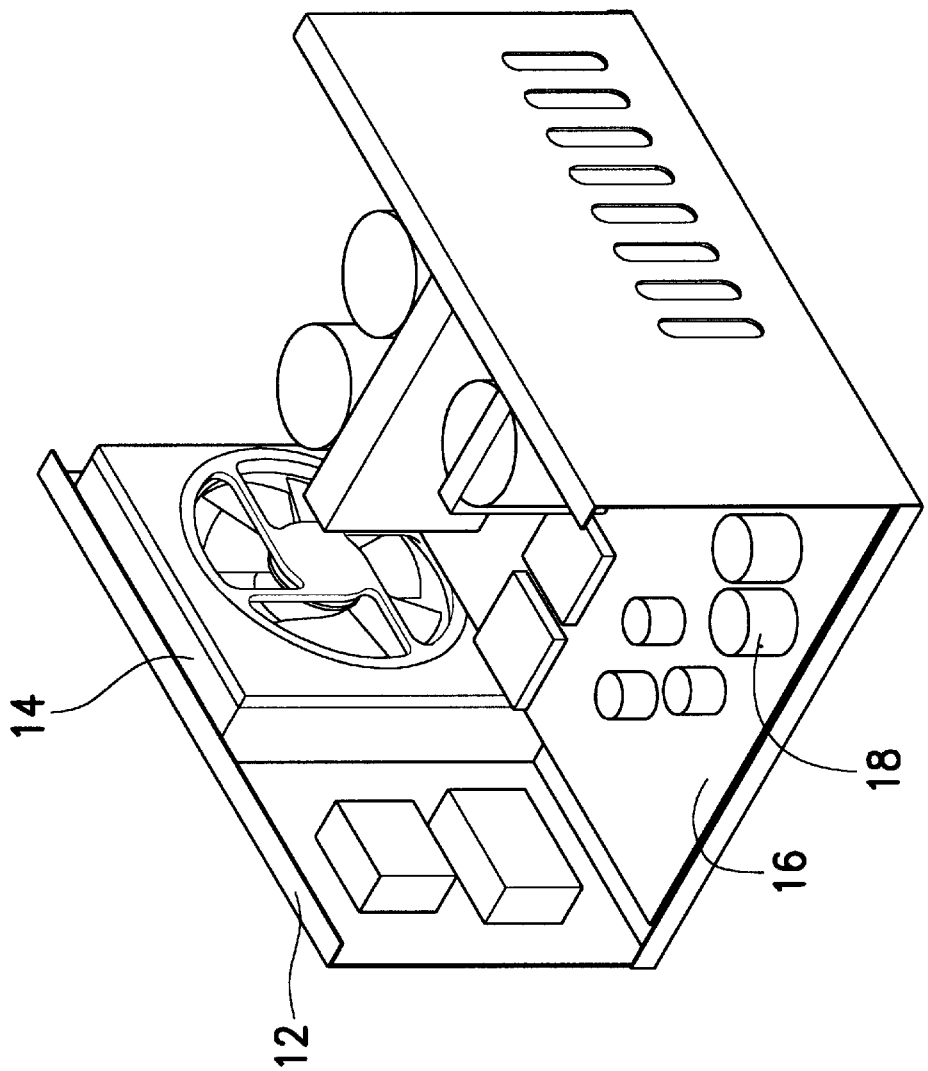
FIG. 1 is a perspective diagram of a conventional power supply.
Figure 2:
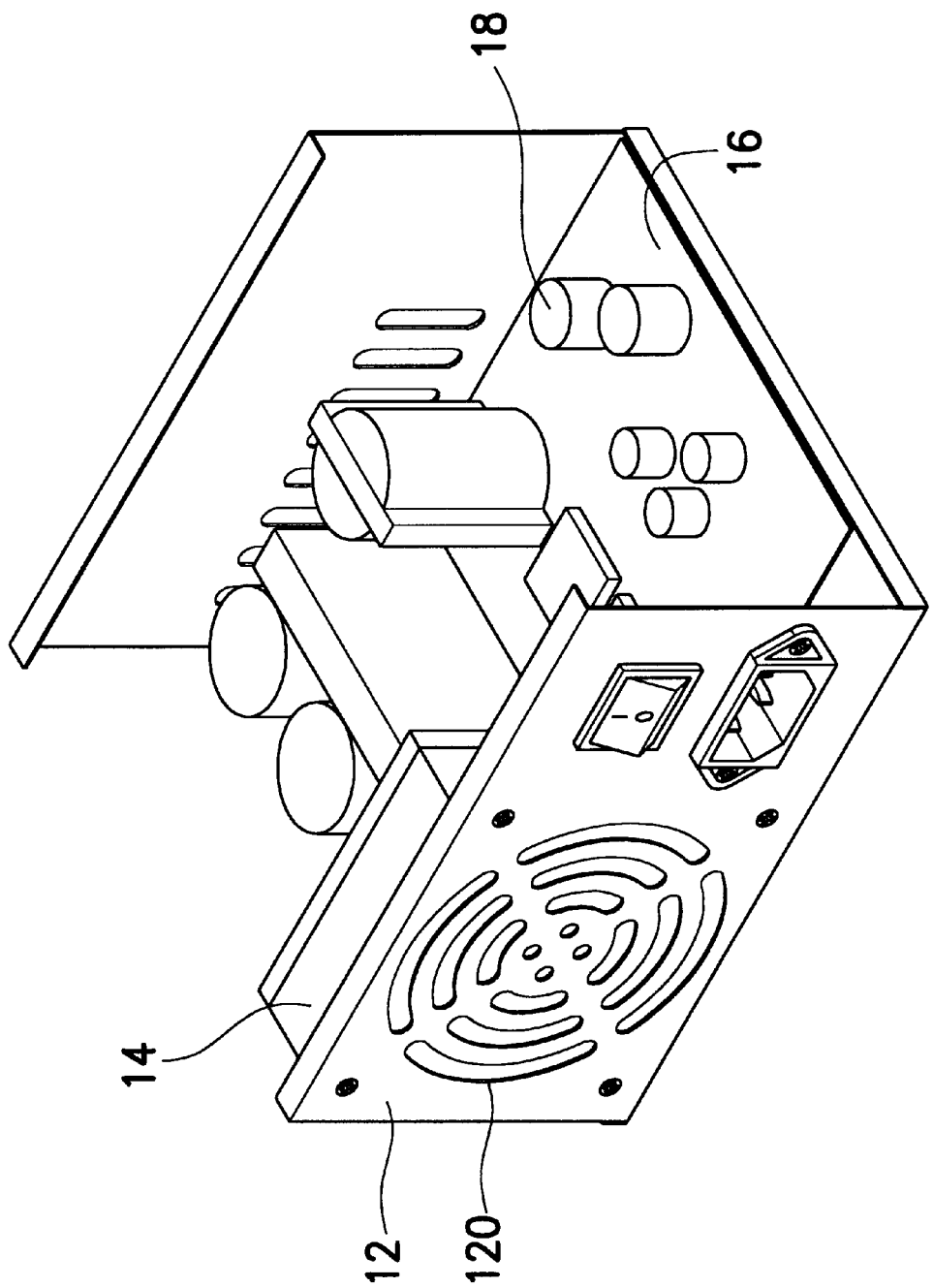
FIG. 2 shows the power supply of FIG. 1 from a different angle.
Figure 3:
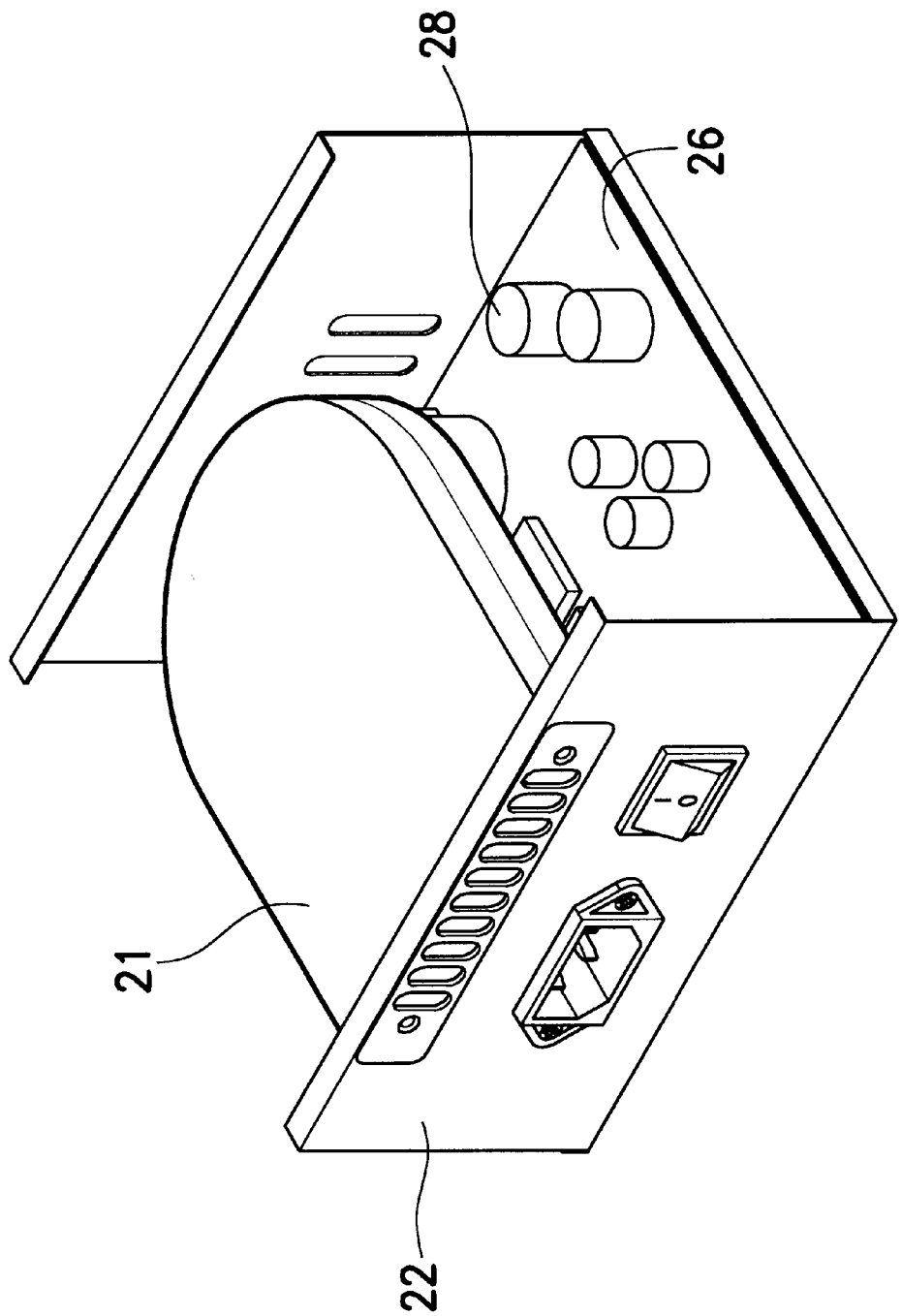
FIG. 3 is a perspective diagram of a power supply in accordance with the present invention.

Referring to FIG. 3, a power supply of the present invention has a housing 22, a printed circuit board (PCB) 26 received in the housing 22 and a plurality of electrical elements 28 attached onto the PCB 26. In operation, the temperature of the electrical elements 28 is high. Therefore, a fan assembly 21 is provided in the housing 22 to ventilate the inside of the power supply and cool down the electrical elements 28. The fan assembly 21 is arranged in parallel to the printed circuit board 26 so as to reduce the thickness of the power supply.

Figure 4:
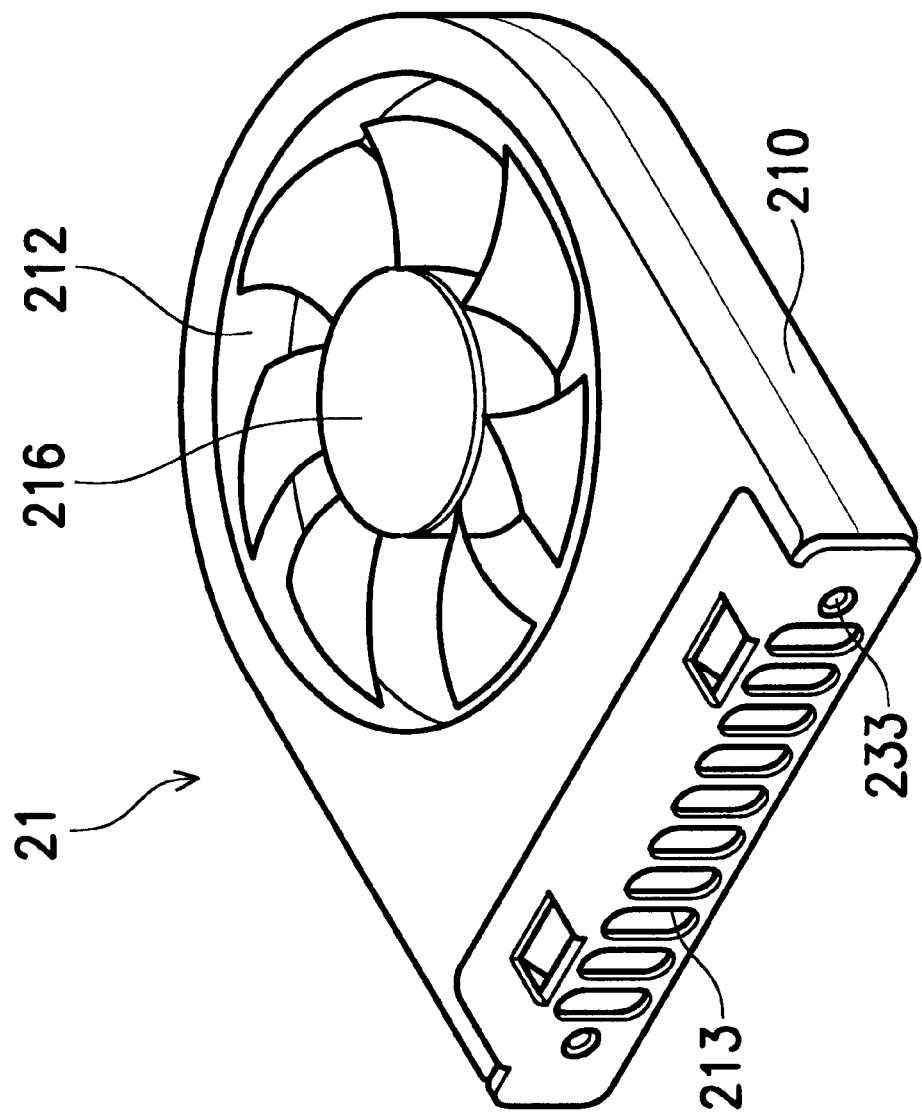
FIG. 4 is a perspective diagram of a fan assembly of a power supply in accordance with the present invention.

Referring to FIG. 4, the fan assembly 21 includes a shell 210 and a fan 216. On a surface board of the shell 210 is provided a first hole 212, while on a side wall of the shell 210 are provided a plurality of second holes 213 and screw holes 233. The fan assembly 21 is screwed to the housing 22 of the power supply via the screw holes 233. It is noted that in FIG. 4 the fan assembly 21 faces up so as to expose the fan 216 and the first hole 212. In FIG. 3, however, the fan assembly 21 faces down so that the fan 216 and the first hole 212 are invisible. In operation, hot air in the housing 22 is drained out by the fan 216 through the first hole 212 and then the second hole 213.

The present invention provides a fan assembly 21 of modified structure so that the fan assembly 21 can be horizontally arranged to ventilate the inside of the power supply. That is, the fan assembly 21 is arranged in parallel to the printed circuit board 26. Thus, the thickness of the power supply is greatly reduced even if the fan assembly 21 is large. Furthermore, the fan assembly 21 is horizontally arranged in the housing 22. Thus, the weight of the fan 216 does not act laterally on the shaft of the fan 216. The life span of the fan assembly 21 is prolonged. Furthermore, the modified structure allows the fan 216 to keep a proper distance from the second holes 213, which constitute the airflow outlet. Thus, the noise of the power supply is greatly reduced.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply disposed in a computer comprising:

a power supply housing having an interior and an exterior;

a printed circuit board provided in the interior of the housing;

at least one electrical element attached onto the printed circuit board; and a fan assembly also provided in the interior of the housing, the fan assembly having:

a shell including two surface boards and plural side walls connected between the two surface boards, wherein the interior and the exterior of the housing are communicated by a first hole formed on one of the two surface boards and at least one second hole formed on one of the plural side walls; and a fan mounted in the shell to ventilate the interior of the housing through the first hole and the at least one second hole.

2. A power supply as claimed in claim 1, wherein the two surface boards of the fan assembly are arranged in parallel to the printed circuit board.

3. A power supply for use inside a computer chassis comprising:

a power supply housing;

a printed circuit board with at least one electrical component disposed inside the power supply housing;

a fan assembly including a shell disposed inside the power supply housing;

wherein the inlet of the fan assembly is generally perpendicular to the outlet of the fan assembly.

4. A power supply for use inside a computer chassis comprising:

a power supply housing;

a printed circuit board with at least one electrical component disposed inside the power supply housing;

a fan assembly including a fan and a shell disposed inside the power supply housing;

wherein the fan has an axis of rotation that intersects with the printed circuit board.

* * * * *